UNITED STATES PATENT OFFICE.

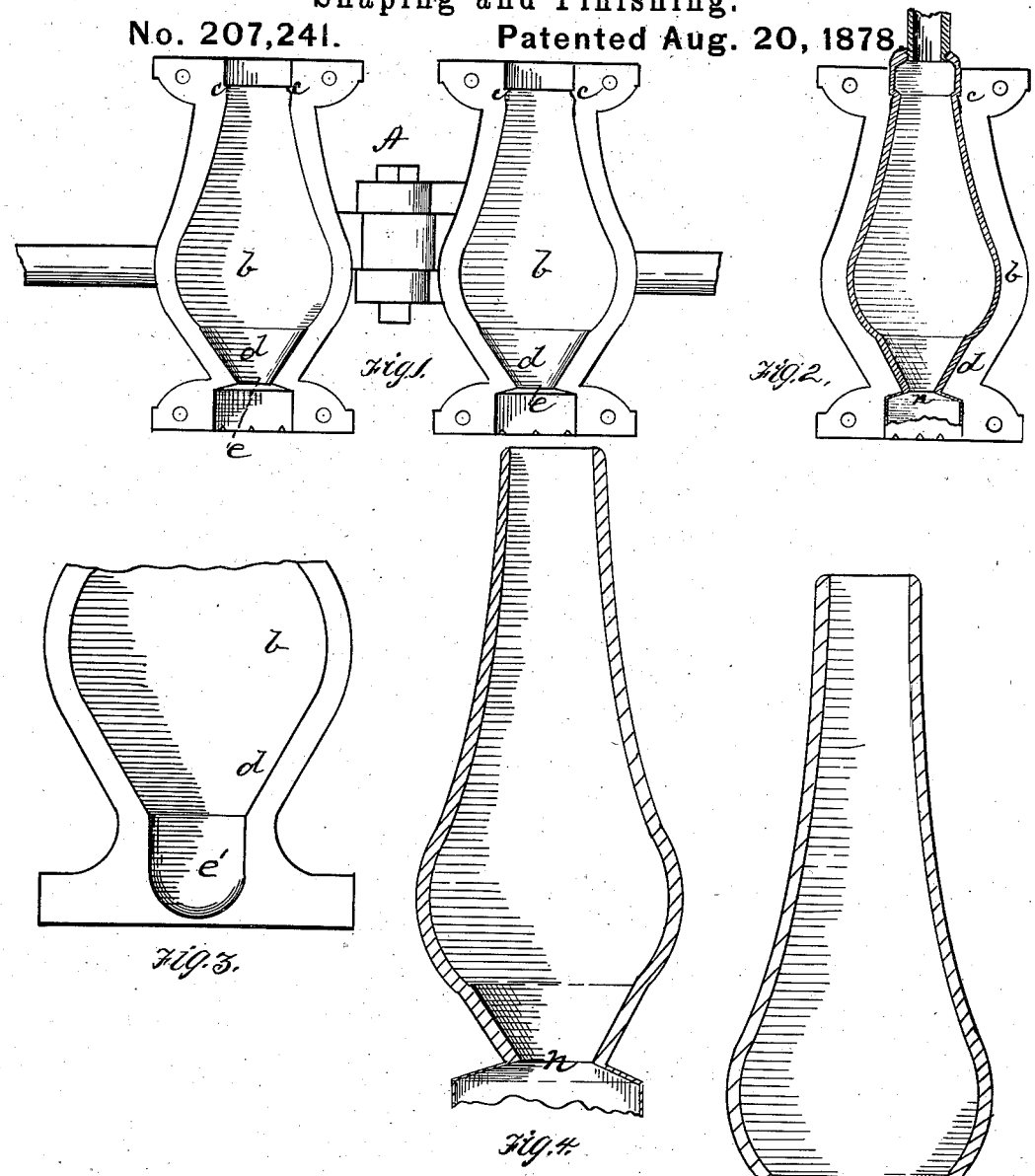

GEORGE W. BLAIR, OF PITTSBURG, PENNSYLVANIA.

IMPROVEMENT IN PREPARING ARTICLES OF GLASSWARE FOR THE PURPOSE OF SHAPING AND FINISHING.

Specification forming part of Letters Patent No. 207,241, dated August 20, 1878; application filed July 23, 1878.

*To all whom it may concern:*

Be it known that I, GEORGE W. BLAIR, of Pittsburg, in the county of Allegheny and State of Pennsylvania, have invented a new and useful Improvement in Method and Means for Preparing Articles of Glassware for the Purpose of Shaping and Finishing; and I do hereby declare the following to be a full, clear, and exact description thereof, reference being had to the accompanying drawing, forming part of this specification, in which—

Figure 1 is a view of an open mold illustrating my invention. Fig. 2 is a vertical section of the same, and of an article formed therein. Fig. 3 is a sectional view of a modification. Figs. 4 and 5 are views of the articles formed in the molds shown in Figs. 1, 2, and 3.

Like letters refer to like parts wherever they occur.

My invention relates to the method and means for forming a definite and exact opening or openings in hollow articles of glassware, for the purpose of facilitating subsequent steps in the manufacture of various articles.

Heretofore in the manufacture of various hollow articles of glassware, of which a lamp-chimney may be selected as the type, it has been customary to blow the article in a mold the cavity of which exceeded the length of the article to be formed, and then to crack off the surplus length of the article, and finally finish the edges by either grinding or fire-polishing. This process is attended with loss from the frequent breaking of the chimney while cracking off the surplus glass, is not calculated to produce uniform results, and the subsequent labor of finishing is such as to materially add to the cost of manufacture. To overcome the irregularity and loss in cracking off, knife-edges have been inserted in the mold to crease the article at the points to be broken. This limits the loss, but does not reduce the labor and cost of subsequent finishing. A third method adopted has been to puncture the article by means of a punch working through the mold, and to subsequently open and shape the article by means of an expansible former and external pressure. The objection to the first part of the last-recited method is, that the edges of the orifice made by the punch are turned in or inverted, and cannot be relied on when subsequently opened out by machinery to give a straight edge and good finish, nor can the hole be punched sufficiently large to permit the subsequent use of a former to advantage. The objections to the second part of the method need not be here recited, as they do not materially affect the subject-matter of the present case.

The special object of the present invention may be stated as a method and means for obtaining a definite opening without inverted edges in an article of hollow glassware, and, when desired, as in the manufacture of lamp-chimneys, to be subsequently opened and finished by machinery, forming such opening on the true axial line in order to obtain uniform results in the subsequent manipulations.

I will now proceed to describe my invention, so that others skilled in the art to which it appertains may apply the same.

In the drawing, A indicates a mold adapted to the production of lamp-chimneys, the matrix or cavity being of the usual form at $b$, and, if desired, provided with a limiting knife-edge or creaser at its upper part near the mouth or blow-hole, as indicated by $c$. The lower part of the mold, wherein is formed the base of the chimney, instead of being continued of even diameter, so as to make an excess in the length to allow of cracking off for finishing, is by me tapered down abruptly, as at $d$, and terminates either in a circumscribed orifice, $e$, Figs. 1 and 2, which is preferred, or a small pocket or cavity, $e'$, Fig. 3. In a lamp-chimney mold this orifice or pocket will be in the vertical axis of the matrix. In any other special form it will be arranged with due consideration to the manner of finishing the article.

Having obtained a mold or former having the characteristics specified, the glass is gathered upon a pipe and the article blown in the usual manner until the mold is filled, and also the cavity $e'$, (when the mold corresponds to Fig. 3,) after which the article is removed from the mold and the teat or tip $i$, Fig. 5, is knocked or broken off, leaving the axial opening $n$, Fig. 4; or if, as preferred by me, the mold is formed with the axial opening $e$, Figs. 1 and 2, the blower, as soon as he finds the mold is full, suddenly increases the power of the blast, forcing or blowing out the glass from the article at that point, e, thus making the axial opening n. The thin glass adhering to the chimney at the opening is chipped or sawed off in the usual manner. This latter method is by far the most desirable.

I am aware that molds having small orifices for the escape of air have been heretofore made and used, and, also, that molds having pockets and various irregular cavities therein for giving the final shape to an article to be made therein are in common use, and do not herein claim such subject-matter.

I am also aware that a press-mold having a reservoir or cavity for surplus material remaining on the top of a chimney formed in the mold, said cavity surrounded by a knife-edge to crease the tip, so that it can be knocked off to leave the article with its finished shape or form, is not new, nor do I herein claim the same; but,

Having thus described the nature and advantages of my invention, what I claim, and desire to secure by Letters Patent, is—

As a step in the process of manufacturing hollow glassware, the mode hereinbefore described of opening the article for the insertion of the expanding-tool, which consists in blowing the article in a mold having a circumscribed cavity or orifice, into or through which the glass to be removed in forming said opening is forced, substantially as described.

In testimony whereof I, the said GEORGE W. BLAIR, have hereunto set my hand.

GEORGE W. BLAIR.

Witnesses:
JAMES I. KAY,
F. W. RITTER, Jr.